United States Patent
Zimmerman et al.

(10) Patent No.: US 9,441,516 B2
(45) Date of Patent: Sep. 13, 2016

(54) METHOD FOR NOX REDUCTION

(75) Inventors: Bret Alan Zimmerman, Grosse Pointe Farms, MI (US); Michael Levin, Ann Arbor, MI (US); John Paul Bogema, Flat Rock, MI (US); Furqan Zafar Shaikh, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1842 days.

(21) Appl. No.: 12/564,746

(22) Filed: Sep. 22, 2009

(65) Prior Publication Data

US 2011/0067381 A1 Mar. 24, 2011

(51) Int. Cl.
- F01N 3/00 (2006.01)
- F01N 3/10 (2006.01)
- F01N 3/20 (2006.01)

(52) U.S. Cl.
CPC ......... F01N 3/2066 (2013.01); *F01N 2240/20* (2013.01); *F01N 2610/02* (2013.01); *F01N 2610/1453* (2013.01); *Y02T 10/24* (2013.01)

(58) Field of Classification Search
CPC .................................................... F01N 3/2066
USPC .................. 60/274, 295, 300, 301, 303, 286
See application file for complete search history.

(56) References Cited

U.S. PATENT DOCUMENTS

| | | | |
|---|---|---|---|
| 1,399,353 A | 12/1921 | Little | |
| 6,722,123 B2 | 4/2004 | Liu et al. | |
| 7,448,206 B2 | 11/2008 | Meingast et al. | |
| 7,908,845 B2 * | 3/2011 | Brown et al. | 60/286 |
| 7,976,788 B2 * | 7/2011 | Drost et al. | 422/225 |
| 2003/0070424 A1 | 4/2003 | Verdegan et al. | |
| 2004/0237511 A1 | 12/2004 | Ripper et al. | |
| 2007/0036694 A1 * | 2/2007 | Nishioka et al. | 422/168 |
| 2008/0092526 A1 | 4/2008 | Kunkel et al. | |
| 2008/0256931 A1 * | 10/2008 | Kawakita et al. | 60/286 |
| 2008/0295497 A1 * | 12/2008 | Kornherr et al. | 60/286 |
| 2008/0302088 A1 | 12/2008 | Koehler et al. | |
| 2008/0306673 A1 * | 12/2008 | Yasui et al. | 701/102 |
| 2009/0019837 A1 * | 1/2009 | Suzuki et al. | 60/286 |
| 2009/0071133 A1 * | 3/2009 | Mabuchi | 60/303 |
| 2010/0005791 A1 * | 1/2010 | Ranganathan et al. | 60/310 |
| 2010/0031639 A1 * | 2/2010 | Kwon | 60/286 |
| 2010/0077742 A1 * | 4/2010 | Ehlen et al. | 60/324 |
| 2011/0283686 A1 * | 11/2011 | Jebasinski | B01F 3/04049 60/295 |
| 2012/0073272 A1 * | 3/2012 | Vanvolsem | B01F 3/04049 60/295 |

* cited by examiner

*Primary Examiner* — Kenneth Bomberg
*Assistant Examiner* — Jason Sheppard
(74) *Attorney, Agent, or Firm* — Julia Voutyras; Alleman Hall McCoy Russell & Tuttle LLP

(57) ABSTRACT

The present application relates to mitigating NOx emissions, and more particularly, to vehicles including a selective catalytic reduction (SCR) system in the exhaust of a diesel or gasoline engine. In one example a method includes temporarily increasing a liquid reductant dosing value injected by an injector from a first dosing value to a second dosing value, the temporary increase in response to a change from injecting liquid reductant onto a first impact location on a disperser device to injecting onto a second impact location on the disperser device.

20 Claims, 3 Drawing Sheets

US 9,441,516 B2

METHOD FOR NOX REDUCTION

TECHNICAL FIELD

The present application relates to mitigating NOx emissions, and more particularly, to vehicles including a selective catalytic reduction (SCR) system in the exhaust of a diesel or gasoline engine.

BACKGROUND AND SUMMARY

Liquid reductant, one example of which is urea, may be injected into an engine's exhaust for use in an SCR catalyst. During low exhaust temperatures (due to, for example, light engine loads and low engine speeds during urban driving) reductant may be slower to evaporate and accumulate within the exhaust, leading to the formation of deposits (e.g., urea deposits) in the exhaust which may degrade engine performance. To reduce such deposits, lower doses of reductant may be injected and a disperser device may be used to break up droplets of injected reductant in the exhaust stream.

The inventors herein have recognized issues with the above described approaches. Injecting a decreased amount of reductant may degrade the SCR catalyst's effectiveness at treating NOx emissions. What is more, a disperser device may not sufficiently increase urea evaporation for light engine loads and higher injection doses. Further still, during changes in engine load, such as during vehicle acceleration from a slow speed, insufficient reductant may be provided at the SCR catalyst to treat NOx emissions, exacerbating the above described problems.

Accordingly, as a brief summary, devices, systems and methods are disclosed for injecting liquid reductant. In one example, a method includes temporarily increasing a liquid reductant dosing value injected by an injector from a first dosing value to a second dosing value, the temporary increase in response to a change from injecting liquid reductant onto a first impact location on a disperser device to injecting onto a second impact location on the disperser device.

One advantage of such an approach is that heat transfer from exhaust flow to the disperser device may be utilized to increase vaporization of reductant, while compensating for the temperature gradients across the disperser device. For example, in the method described above, the second location may include higher temperature portions of the disperser device, the higher temperature portions causing increased evaporation of the reductant. Further, during transient engine conditions (such as increasing engine load or increasing engine speed) the second location may include little or none of the first location, leading to further heating of the reductant, and thus increased vaporization.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
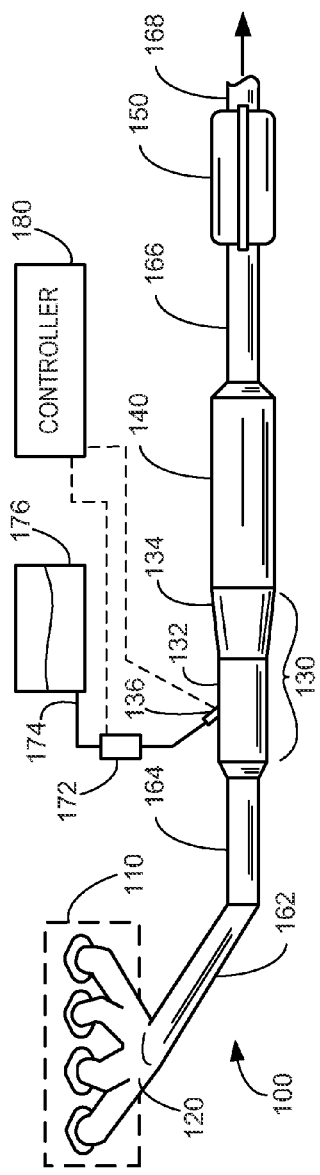
FIG. 1 illustrates an exhaust system for transporting exhaust gases produced by internal combustion engine.

FIG. 1 illustrates an exhaust system 100 for transporting exhaust gases produced by internal combustion engine 110. As one non-limiting example, engine 110 includes a diesel engine that produces a mechanical output by combusting a mixture of air and diesel fuel. Alternatively, engine 110 may include other types of engines such as gasoline burning engines, among others. In some embodiments, engine 110 may be configured in a propulsion system for a vehicle. While exhaust system 100 may be applicable to stationary applications, it should be appreciated that exhaust system 100 as described herein, is particularly adapted for vehicle applications, particularly where geometric limitations limit the mixing region of the exhaust gases and reductant.

Exhaust system 100 may include one or more of the following: an exhaust manifold 120 for receiving exhaust gases produced by one or more cylinders of engine 110, a mixing region 130 arranged downstream of exhaust manifold 120 for receiving a liquid reductant, a selective catalytic reductant (SCR) catalyst 140 arranged downstream of the mixing region 130, and a noise suppression device 150 arranged downstream of catalyst 140. Additionally, exhaust system 100 may include a plurality of exhaust pipes or passages for fluidically coupling the various exhaust system components. For example, as illustrated by FIG. 1, exhaust manifold 120 may be fluidically coupled to mixing region 130 by one or more of exhaust passages 162 and 164. Catalyst 140 may be fluidically coupled to noise suppression device 150 by exhaust passage 166. Finally, exhaust gases may be permitted to flow from noise suppression device 150 to the surrounding environment via exhaust passage 168. Note that while not illustrated by FIG. 1, exhaust system 100 may include a particulate filter and/or diesel oxidation catalyst arranged upstream or downstream of catalyst 140. Furthermore, it should be appreciated that exhaust system 100 may include two or more catalysts.

In some embodiments, mixing region 130 can include a greater cross-sectional area or flow area than upstream exhaust passage 164. Mixing region 130 may include a first portion 132 and a second portion 134. The first portion 132 of mixing region 130 may include an injector 136 for selectively injecting a liquid into the exhaust system. As one non-limiting example, the liquid injected by injector 136 may include a liquid reductant such as ammonia or urea. Reductant tank 176 may store reductant that is delivered to reductant pump 172 and injector 136 via reductant line 174. An electronic controller 180 may control pump 172 to pressurize reductant for delivery to the exhaust via injector 136. Further the controller 180 may meter a dosing value injected of injector 136 being, where a dosing value may be a dosing rate or a dose amount, for example.

The second portion 134 of mixing region 130 may be configured to accommodate a change in cross-sectional area or flow area between the first portion 132 and the catalyst 140. Note that catalyst 140 can include any suitable catalyst for reducing NOx or other products of combustion resulting from the combustion of fuel by engine 110.

Note that with regards to vehicle applications, exhaust system 100 may be arranged on the underside of the vehicle chassis. Additionally, it should be appreciated that the exhaust passage may include one or more bends or curves to accommodate a particular vehicle arrangement. Further still, it should be appreciated that in some embodiments, exhaust system 100 may include additional components not illustrated in FIG. 1 or may omit components described herein.

Figure 2:
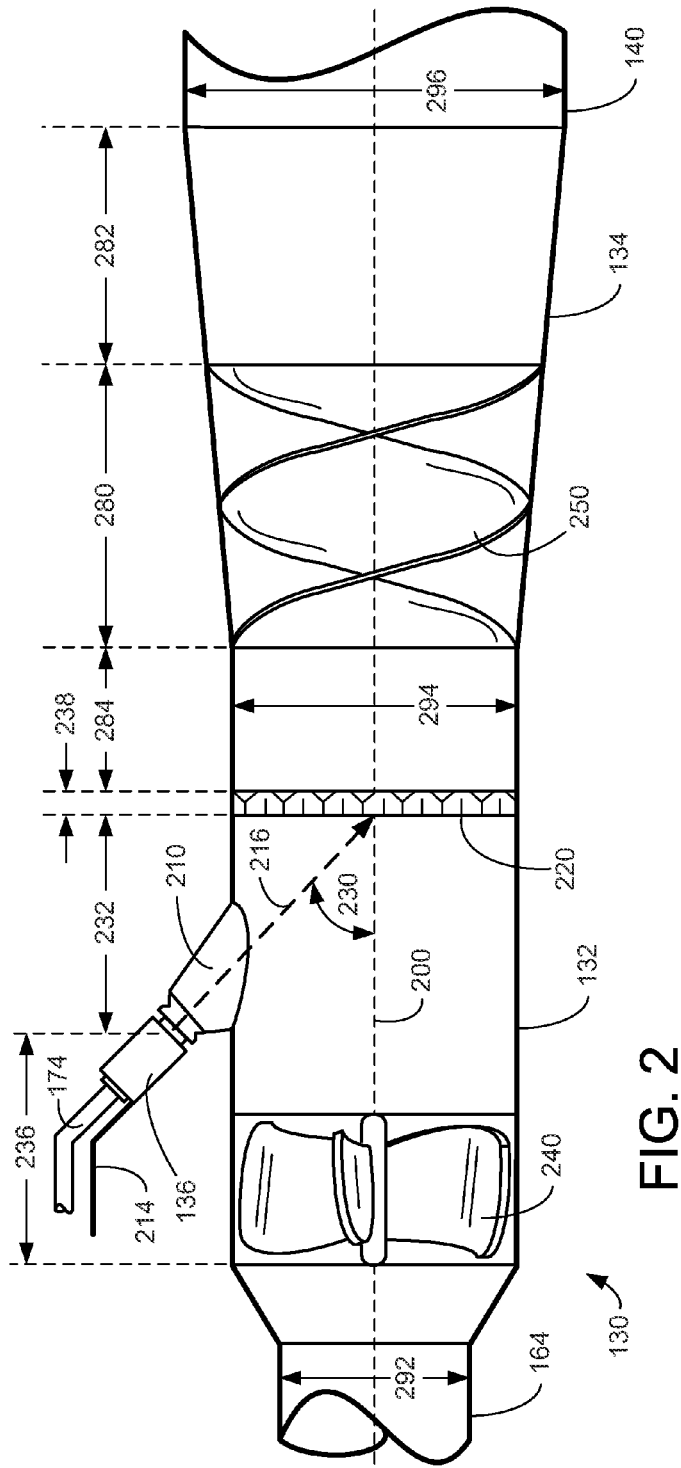
FIG. 2 illustrates a side view of the exhaust system of FIG. 1 in greater detail as a longitudinal cross-section.

FIG. 2 illustrates a side view of mixing region 130 in greater detail as a longitudinal cross-section. A center longitudinal axis of mixing region 130 is indicated at 200. Injector 136 is shown coupled to a wall of the first portion 132 of mixing region 130 by an injector boss 210. In this example, injector 136 is external from the flow area of the exhaust passage. In this way, the injector may be protected from thermal degradation, which may be caused by high temperature exhaust gases. Further, as the injector may be recessed beyond the wall of the exhaust passage via the injector boss, interruption of the exhaust flow by the injector may be reduced. Injector 136 can inject, through an opening in the wall of the mixing region, a liquid supplied to it by reductant line 174 in response to a control signal received via communication line 214 from an electronic control system of engine 110. The liquid may be supplied to injector 136 through reductant line 174 from a storage tank via an intermediate pump. Note that the pump may also be controlled by an electronic control system of engine 110 to provide suitably pressurized reductant to injector 136.

Injector 136 can be oriented to inject the reductant toward a first mixing device 220 along an injection axis 216 as a spray. As one non-limiting example, first mixing device 220 may comprise a disperser device including a plurality of fins configured to redirect the injected reductant and facilitate break-up of the spray into smaller droplets. The plurality of fins may be further arranged as two or more sets, each set angled in a different manner with respect to center longitudinal axis 200 and/or the direction of flow (as discussed below with respect to FIGS. 3 and 4). Further device 220 is one example of a flap mixer that includes a plurality of angled flaps or other deflecting elements. A non-limiting example of first mixing device 220 having disperser device configuration including a plurality of fins is described in greater detail below with reference to FIGS. 3-7.

In some embodiments, injection axis 216 can be coincident with a center of the spray pattern provided by injector 136. The spray pattern provided by injector 136 may include a suitable pattern for improving the mixing and evaporation rate of the reductant with the exhaust gases. For example, an injector can provide sprays that form sheets, filled cones, hollow cones, multiple cones, etc. As one non-limiting example, the spray pattern provided by injector 136 may include three cones having an equidistant spacing from each other, whereby the center-line of each of the three cones forms a triangle. However, it should be appreciated that other suitable spray patterns may be utilized.

Injection axis 216 can be directed at a particular region of first mixing device 220. As one non-limiting example, injection axis 216 can intersect the center of first mixing device 220, which may also be coincident with longitudinal axis 200. In this example, injector boss 210 is configured to couple injector 136 to the wall of the exhaust system so that injection axis 216 is angled relative to longitudinal axis 200 at an angle indicated by 230. As one non-limiting example, angle 230 may be an angle of approximately 45 degrees. As another example, angle 230 may be an angle between 20 degrees and 55 degrees. For example, angle 230 may be approximately 30 degrees. However, it should be appreciated that other suitable angles may be utilized.

Note that the angles described herein may be with reference to a particular flow condition. For example, the angle of injection axis 216 as described above may be measured with reference to a condition where there is no exhaust flow. As the flow of exhaust gases increase, the spray pattern provided by the injector may change as the liquid reductant is entrained by the exhaust gases. The impact of the spray pattern on the first mixing device 220, and the injection axis 216 are discussed in further detail below with reference to disperser device 320 in FIGS. 3 and 4.

The combination of the first and second mixing devices described herein can be used to enable the injection of liquid reductant via injector 136, without requiring an air assisted injector that uses compressed air to assist in vaporization of the liquid spray. In this way, the cost and/or complexity of the injector may be reduced. However, it should be appreciated that the approaches described herein may be used with air assist in other embodiments.

In some examples, geometric constraints associated with an exhaust system may serve to increase the rate at which evaporation and mixing of the reductant with the exhaust gases is to be performed so that the reductant is sufficiently atomized prior to reaching the catalyst. Further, some exhaust system configurations may require that the drops of liquid within the spray be less than a particular size to achieve a particular rate of evaporation and/or mixing of the liquid into the exhaust gases. As one non-limiting example, for some exhaust systems, the drops of liquid within the spray must be less than 40 microns in diameter. However, the price of an injector may increase in proportion to a decreasing size of the drops of liquid provided by its spray. Thus, in order to reduce cost of the injector, it may be desirable to improve mixing and evaporation rates so that an injector providing a spray having larger drops of liquid may be used. Furthers still, deposition of reductant onto the wall surfaces and catalyst of the exhaust system should be reduced to reduce formation of deposits upon evaporation of the liquid from these surfaces.

In some embodiments, mixing region 130 may include an upstream mixing device 240 having a leading edge arranged upstream of the point of injection by a longitudinal distance indicated by 236. Note that in some embodiments, upstream mixing device 240 may be omitted. Mixing device 240 can be configured to induce turbulence or increase turbulence in the flow of exhaust gases to improve mixing of the liquid that is injected downstream of mixing device 240 by injector 136. Mixing device 240 may include one or more turbulence inducing fins mounted according to an optimized rotational and longitudinal relationship with reference to the location of injection of the liquid reductant. Where the spray pattern provided by injector 136 includes more than one jet, the arrangement of the fins associated with mixing device 240 may be selected to provide a turbulence pattern that is suited to enhance breakup and mixing of the spray, reducing evaporation time, and hence evaporation distance along the longitudinal length of mixing region 130.

In some embodiments, a second mixing device 250 may be arranged downstream of first mixing device 220. As illustrated in FIG. 1, second mixing device 250 may be configured in an expanding region of the second portion 134 of mixing region 130. As one non-limiting example, second mixing device 250 may include a helical configuration. The helical configuration can be used to force the exhaust gases and the entrained droplets of the injected liquid to follow a longer path along or around the second mixing device, which can increase the evaporation time of the liquid. In this way, mixing of the exhaust gases and the injected liquid can be improved, thereby enabling a reduction in the longitudinal distance between the injector and the face of the SCR catalyst as indicated by the summation of distances 232, 238, 284, 280, and 282. The resulting increase in the rate of mixing and evaporation of the liquid may be used to enable an increase in the size of the droplets of the liquid spray provided by the injector, thereby enabling a reduction in the cost of the injector, at least with some conditions.

As a more specific example of a helical mixer, mixing device 250 may include a substantially thin wall or plate having a 360 degree twist along its longitudinal length as indicated by 280. However, it should be appreciated that second mixing device 250 may have a twist that is greater than or less than 360 degrees across its longitudinal length. In some embodiments, second mixing device 250 may be omitted. Note that in some embodiments, second mixing device 250 may occupy only a portion of the longitudinal length of the expanding second portion 134 of mixing region 130. The longitudinal distance between second mixing device 250 and the face of SCR catalyst 140 is indicated by 282. As one example, second mixing device 250 has a longitudinal length indicated by 280. Further second mixing device 250 may be arranged near or at the upstream end of the expanding second portion 134 and have a total longitudinal length that includes the summation of lengths 280 and 282. Similarly, first mixing device 220 may be arranged at a longitudinal distance upstream from an upstream end of an expanding region included in second portion 134 and/or second mixing device 250 as indicated by 284.

A non-limiting example of a specific embodiment of the exhaust system illustrated in FIG. 2 will be described. Exhaust system 100 may include exhaust passage 164 as defined by diameter 292, first portion 132 as defined by diameter 294, and second portion 134 transitioning between diameter 294 and the diameter 296 of SCR catalyst 140 each having substantially circular cross-sections or flow areas. As one example, diameter 292 may be approximately 4 inches, diameter 294 may be approximately 6 inches, and diameter 296 may be approximately 8 inches. The longitudinal length between the point of injection and the upstream end of the expanding region at 134 as defined by the summation of 232, 238, and 284 may be approximately 8 inches in length. The longitudinal length of the expanding region at 134 may be approximately 11 inches in length. The length of mixing device 250 may be approximately 5.6 inches in length as indicated by 280. This example embodiment, when utilized with a 45 degree injection angle of liquid including ammonia, can be used to achieve an ammonia or urea concentration uniformity with the exhaust gases in excess of 95% at the upstream face of SCR catalyst 140, at least under some conditions. As another example, the ammonia or urea concentration uniformity with the exhaust gases may be in excess of 90%. Thus, the conversion of NOx by the SCR catalyst may be improved while reducing the deposition of residues from the injected liquid.

It should be appreciated that the above specific embodiment is merely one example of the relative dimensions that may be used, and that the present disclosure enables different dimensions or configurations to be used. Furthermore, it should be appreciated that one or more of the various exhaust system components may include flow areas or cross-sections that have shapes that are non-circular. For example, cross-sections of the exhaust components may include shapes that are ovals, rectangles, squares, or other suitable shapes.

Figure 3:
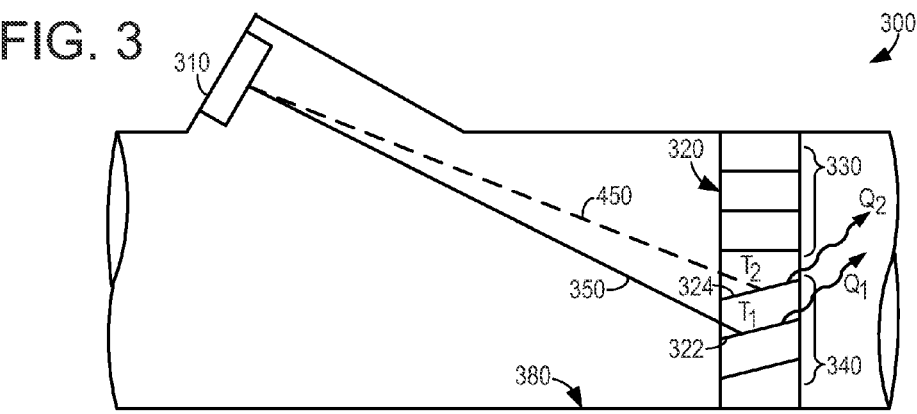
FIG. 3 shows a further view of the portion of example mixing region including a first injection axis.

FIG. 3 shows a portion of a non-limiting example mixing region 300, including an example reductant injector 310, and a first mixing device, disperser device 320. Disperser device 320 includes a first set of fins 330 parallel to a direction of exhaust flow and a second set of fins 340 angled to the direction of exhaust flow. Injector 310 injects reductant along a first injection axis 350 and impacts at a first location including first fin 322. A second injection axis 450 is shown by a dashed line and is described in more detail below with respect to FIG. 4. Injecting reductant onto the first fin 322 is one example of a first operating mode. Furthermore, in the first mode, injector 310 may inject reductant, such as urea, at a first dosing value (described in more detail below with respect to FIGS. 8 and 9). First fin 322 may be at a temperature $T_1$ that is less than the remaining fins of the device 320, because it is being cooled by reductant injected from injector 310. Consequently, an amount of heat $Q_1$ radiated from first fin 322 may be less than the heat radiated from additional fins, such as $Q_2$ radiated from a second fin 324.

In the present example, second fin 324 is shown adjacent to first fin 322. Second fin 324 may be at a second temperature $T_2$ with second amount of radiated heat $Q_2$. The temperature $T_2$ at the second fin 324 may be higher than $T_1$, because of, for example, convective heating by exhaust gas. Further, second fin 324 is shown adjacent without intervening fins between second fin 324 and first fin 322. However, in additional examples, second fin 324 may be separated from first fin 322 by one or more fins (as described in more detail below). Further still, in the present example, first fin 322 and second fin 324 are shown as both being in the second set 340. In additional examples, either one or both of first fin 322 and second fin 324 may be in the first set 330.

Figure 4:
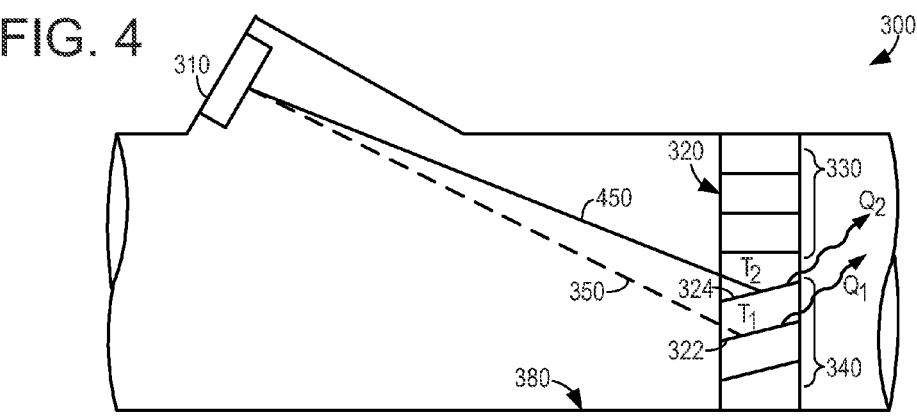
FIG. 4 shows a further view of the portion of example mixing region including a second injection axis

FIG. 4 shows a further view of the portion of example mixing region 300 of FIG. 3. Injector 310 is shown injecting reductant along a second injection axis 450 and impacting the disperser device 320 at a second location including second fin 324. First injection axis 350 is shown as a dashed line for comparison. Injecting onto the second fin 324 is one example of a second operating mode. Furthermore, in the second operating mode, injector 310 may inject reductant, such as urea, at a second dosing value (described in more detail below with respect to FIGS. 8 and 9). Second fin 324 is at least temporarily at a second temperature $T_2$ with second radiated heat $Q_2$. In the example where injector 310 transitions from injecting along first injection axis 350 to second injection axis 450, $T_2$ may be significantly higher than $T_1$. If $T_2$ is significantly higher than $T_1$, then there may be increased evaporation of reductant at second fin 324, allowing for the second dosing value to be greater than the first dosing value while reducing reductant deposits on the interior 380 of mixing region 300. What is more, the second dosing value may be further determined by at least one of the angle of the second fin and a surface area of the second fin included in the second impact location.

Figure 5:
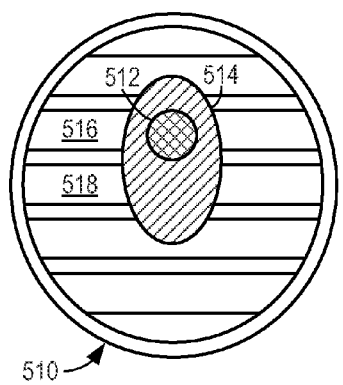
FIG. 5 shows a first example disperser device.
Figure 6:
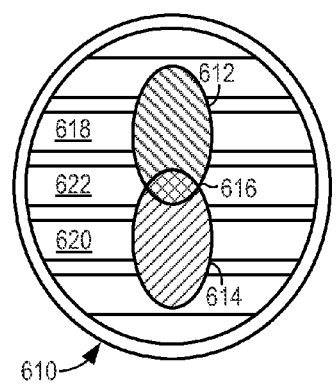
FIG. 6 shows a second example disperser device.
Figure 7:
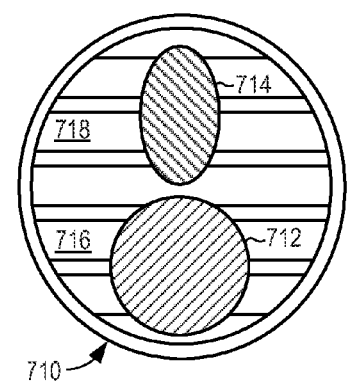
FIG. 7 shows a third example disperser device.

Turning now to FIGS. 5-7, example disperser devices 510, 610 and 710 respectively are shown. In the present examples, disperser devices 510, 610 and 710 are circular in shape, with a plurality of fins arranged parallel to each other. However, in further examples, a disperser device may take on additional forms such as a porous grating, metal strip, etc. The fins may be angled (as described above with respect to FIGS. 3 and 4). As described below in more detail at FIGS. 8 and 9, an example injector may temporarily increase a liquid reductant dosing value injected from a first dosing value to a second dosing value in response to a change from injecting liquid reductant onto a first impact location on a urea disperser device to injecting onto a second impact location on the urea disperser device (for example where the exhaust flow rate changes, thus changing the effective injection angle). The second location may include higher temperature portions of the disperser device (at least temporarily), and the higher temperature portions may cause increased evaporation of the reductant, allowing for the increased dosing value without increasing deposits of the liquid reductant.

Further, example first and second impact locations are described with reference to FIGS. 5-7 and shown as continuous surface areas. However, in additional examples, locations may include where groups of droplets impact in a rough approximation of a continuous surface area. Further, more reductant may be injected in regions or portions of a location than the remainder of the location, or additional portions of the location.

In a first example, FIG. 5 shows a first location 512, including a first fin 516, where reductant spray impacts the disperser device 510. Second location 514 is another example of where reductant spray may impact the disperser device 510 and includes second fin 518. Further, in the present example second location 514 includes all of first location 512. A surface area of the first location 512 is smaller than a surface area of the second location 514. Further, in the present example, the first fin is positioned next to the second fin without any fins intervening between the first and second fins.

Turning now to FIG. 6, a second example disperser device 610 includes a first location 612 (including first fin 618) where reductant spray impacts the disperser device 610. Second location 614 is a further example of where spray from an example injector may impact the disperser device 610 and includes second fin 620. Further, in the present example second location 614 partially overlaps with first location 612 at 616. A surface area of the first location 612 is the same as a surface area of the second location 614. Further, in the present example, intervening fin 622 is positioned in between the first fin 618 and second fin 620.

FIG. 7 shows a third example disperser device 710 including a first location 712 (including first fin 716) where reductant spray impacts the disperser device 710. Second location 714 is a further example of where spray from an example injector may impact the disperser device 710 and includes second fin 718. Further, in the present example second location 714 does not overlap with first location 712. A surface area of the first location 712 is greater than a surface area of the second location 714. Further, in the present example, the first fin 716 is not positioned adjacent to second fin 718.

Figure 8:
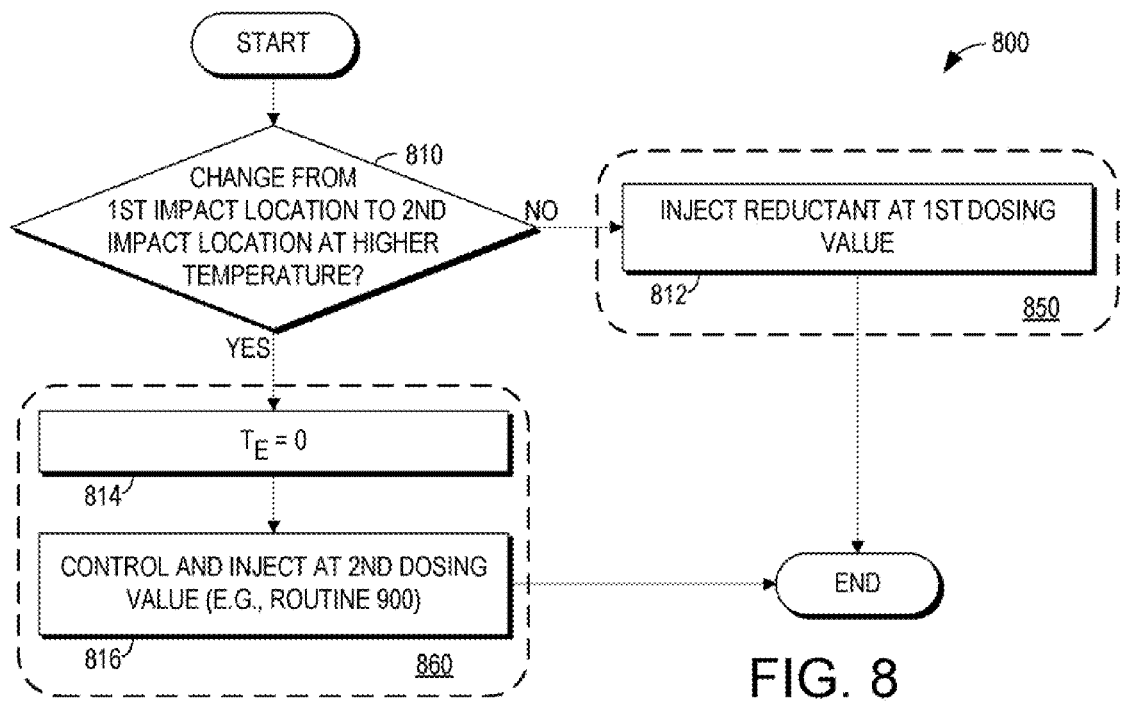
FIG. 8 illustrates an example routine providing a method for a reductant injector to increase an amount of reductant delivered to a catalyst in an SCR system.

Turning now to FIG. 8, a routine 800 is shown as one example method for a reductant injector to increase an amount of reductant delivered to a catalyst in an SCR system. In routine 800, urea is used as an example reductant; however additional examples of routine 800 include further reductants such as ammonia. Routine 800 may be a routine carried out by an example controller and implemented by an example SCR system, such as is described above. Further, in some such examples, routine 800 is one iteration of instructions, run in the controller repeatedly for continuous control.

In the present example routine 800 includes first, at 810, determining if there is a change in where reductant is impacting the disperser device from a first impact location to a second impact location. Further, in the present example, the second location is at a higher temperature than the first location at the time of the change in impact location. Changes in location are described, for example, with respect to FIGS. 5-7 and may be the result of increased or decreased exhaust flow during transient engine conditions (such as a change in engine load, a change in engine speed, etc.), or may be due to other variations, such as injection pressure. Further a change or transition from a first location to a second location may be due to a change in spray pattern (as described with respect to FIG. 1) or change in a surface area impacted by a spray pattern. Such a determination at 810 may also include noting a time elapsed since a pervious increase from a first dosing value to a second dosing value.

If there has not been a change from a first location to a second location, the routine continues to 812 to inject reductant at a first dosing value. Further in some examples, routine 800 includes at 812 injecting urea at the first dosing value onto the first location including a first fin at a first temperature, the first fin included in a plurality of fins included in a urea disperser device, the plurality of fins arranged across an exhaust passage downstream of the urea injector and upstream of the SCR catalyst. The first dosing value may be determined as a maximum reductant dose or dosing rate that enables reduction of NOx downstream at an SCR catalyst while limiting deposits of urea within the engine exhaust passage. However, the first location may include portions of the disperser device at the first temperature that is less than the temperature of remaining parts or portions of the disperser device because, for example, the first location is being cooled by reductant injected from the injector. Consequently the first dosing value may be limited by the first temperature. After 812, the routine may end.

If at 810, there has been a change from the first location to the second location, the routine 800 continues to 814 to set a variable $T_E$ to zero. $T_E$ may be an elapsed time since the determination that injection has changed and/or transitioned from the first location to the second location. Further examples of the routine may omit setting a time tracking variable to zero. Additionally, routine 800 may include at 814 generating a time stamp, starting a timer, etc. or may use further methods for tracking time during running of the routine.

After 814, the routine 800 continues to 816 to control and inject at a second dosing value. In the present example, the second dosing value is at least temporarily greater than the first dosing value. The second dosing value may be determined as a maximum reductant dose or dosing rate that enables reduction of NOx downstream at an SCR catalyst while limiting deposits of urea within an engine exhaust. Further the routine may include tracking time via incrementing a time variable (e.g., $T_E$) to further control dosing at the second value. Further, in the present example the second dosing value includes a dose or dosing rate that utilizes the evaporative heating of some or all of a disperser device.

Further, in examples where the injector is dosing urea at the first dosing value prior to the start of routine 800, the routine may include at 816, temporarily increasing a urea dosing value injected by the injector from a first dosing value to a second dosing value. The temporary increase may be in response to a change from injecting urea onto the first impact location on the disperser device to injecting onto the second impact location on the disperser device, as determined at 810. Further, routine 800 may include at 816, injecting at the second dosing value at a second location (including a second fin) in response to injecting onto the second location, the second fin at least temporarily at the second temperature higher than the first temperature of the first location at the time of the transition. One example of the process at 816 is shown in greater detail below as routine 900 described below with respect to FIG. 9. After 816, the routine 800 may end.

A dashed box at 850 is further shown in FIG. 8 to indicate a first mode. In one example, the first mode 850 includes injecting reductant at the first dosing value onto the first location, the first location including the first fin of the plurality of fins included in the disperser device, the plurality of fins arranged across the exhaust passage downstream of the injector and upstream of the catalyst. Further, FIG. 8 also shows a dashed box at 860 to indicate a second mode. Second mode 860 may include injecting urea at the second dosing value onto the second location, the second dosing value greater than the first dosing value, the second location including the second fin of the plurality of fins, the second fin at a higher temperature than the first fin at the time of transitioning from the first mode to the second mode. As noted herein, following the transition to the first mode, the temperature of the second fin may cool (due to increased evaporation of injected reductant). During this cooling the second dosing value may also be correspondingly reduced, as described further below with regard to FIG. 9.

Figure 9:
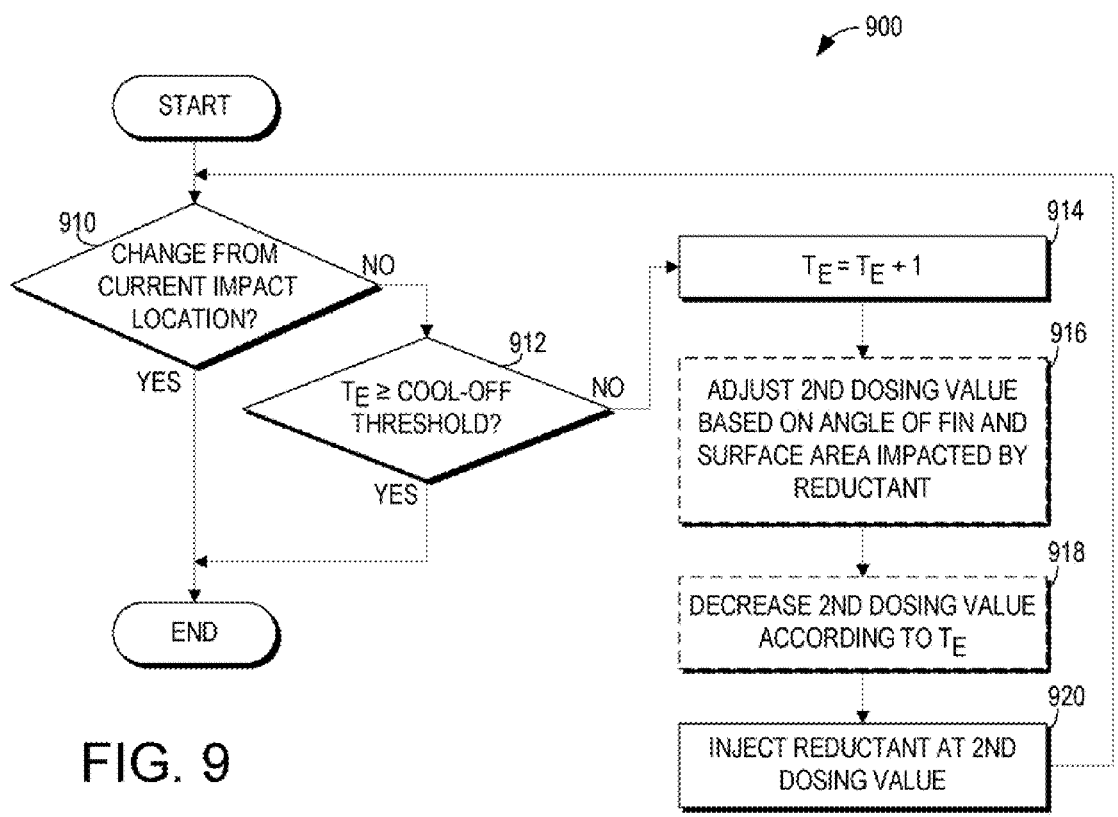
FIG. 9 illustrates an example routine providing a method for controlling and injecting a reductant at a dosing value that includes a dose or dosing rate utilizing the evaporative heating of some or all of a disperser device.

FIG. 9 shows an example routine 900 which is one example of a method for controlling and injecting a reductant at a dosing value that includes a dose or dosing rate utilizing the evaporative heating of some or all of a disperser device (e.g. such as the second dosing value of FIG. 8). In routine 900, urea is used as an example reductant; however additional examples of routine 900 include further reductants such as ammonia. Routine 900 may be a routine carried out by a controller and implemented by an example SCR system, such as described above. In some such examples, routine 900 is one iteration of instructions, run in the controller repeatedly for continuous control. Further, routine 900 may be incorporated as a subroutine or process in further routines and methods (for example at 816 in routine 800).

Routine 900 begins at 910 by determining if there has been a change in where reductant impacts, such as urea from the second location. If there has been a change from the second location, the routine may end. In some examples, routine 900 may continue to carry out further processes and routines associated with determining a change from the current impact location to a further impact location, e.g. from a hotter impact location to a cooler impact location. In this way, routines 800 and 900 may include decreasing a reductant dosing value to the first dosing value in response to injecting urea from the second impact location to the first impact location if the first impact location has not been exposed to hot exhaust gas for a sufficient time (e.g., if an elapsed time $T_E$ is less than or equal to a heat-up threshold). The routine 900 also includes at 910 determining a change from a cooler impact location to a hotter impact location (such as change between first and second locations determined at 810 in routine 800). Such an example is discussed in more detail below. If there has been a change from the current impact location, the routine may end.

If there has not been a change from the current impact location, the routine continues to 912 to determine if a time elapsed $T_E$ is greater than or equal to a cool-off threshold. A cool-off threshold may be a time value based on at least one of heat capacity of the material of the disperser device, exhaust temperature, exhaust flow rate, etc. to determine if a dosing value greater than the first dosing value may be accommodated without increasing deposits of reductant within an example exhaust passage. Further examples of routine 900 includes injecting urea at a first dosing value after a determination that $T_E$ is greater than or equal to a cool-off threshold. In the present example, routine 900 ends. In still further examples, routine 800 is called after a determination that $T_E$ is greater than or equal to a cool-off threshold, and based on a determination that impact location has not changed (e.g., at 910 and/or 810), reductant is injected at the first dosing value (e.g., at 812). In this was way, routines 800 and 900 may include decreasing the urea dosing value to the first dosing value after injecting onto the second impact location for an elapsed time greater than or equal to a cool-off threshold.

If $T_E$ is not greater than or equal to a cool-off threshold the routine may continue to 914 which includes incrementing the variable $T_E$ (i.e., $T_E=T_E+1$). Next routine 900 optionally includes at 916 (as indicated by the dashed box) further adjusting the second dosing value based on a fin angle or a surface area impacted in the second location. In this way routine 900 includes determining the second dosing value by at least one of the angle and the surface area of the fin included in the second impact location. Further, after 916 the routine may optionally include at 918 (as indicated by the dashed box) decreasing the second dosing value to an adjusted second dosing value in response to an elapsed time (e.g., a value of variable $T_E$) injecting reductant onto the second impact location. Further, at 920, the routine includes injecting reductant at the second dosing value. The routine then returns to 910. In further examples of routine 900, the routine may end.

In order to further present the advantages of the above described systems, devices and methods, specific examples are described below with respect to the various drawings. In a first example, a transition from a second mode to a first mode (e.g., decreasing from a second higher dosing value to a first lower dosing value) takes place. In the present example, an example injector and disperser device (as discussed, at the least with respect to FIGS. 3 and 4) transitions from injecting at a second location to a third location (e.g., from injecting along injection axis 450 to injecting along injection axis 350). An example controller that meters the injection of reductant by the example injector according to instructions included in the controller (e.g., routines 800 and 900).

Before transitioning between reductant dosing values, the controller determines that a change of impact location has occurred (e.g., at 910 or 810). Further, the new third location may be substantially the same as a previous first impact location, or impact location occurring prior to the first impact location. The controller may then carry out instructions to determine if the third location is at a temperature higher than the second impact location (e.g., at 810) where the second impact takes on the role of a new first location and the third location takes on the role of a new second location.

Further, the instructions may include reference to time stamps indicating when in the past the third location was last impacted with reductant. Additionally, the instructions may include determining if an elapsed time (e.g., the value of variable $T_E$) is less than or equal to a heat-up threshold required to heat the third location since when the third location was last impacted with reductant. A heat-up threshold may be determined in a way similar to the cool-off threshold in 912, described above with reference to FIG. 9.

Further still, a temperature reading may be made of a portion or all of the disperser device, and/or exhaust gases. Such determinations may already be included in routine 800 (e.g., at 810) or may be included additional examples of routines 800 or 900.

In response to a time-based and/or a temperature based test determining that the third location is at a higher temperature than the second location, the instructions on the controller may include injecting at the second, increased dosing value (e.g., a "YES" at 810). In response to a time-based and/or a temperature based test determination that the third location is at a lower temperature than the second location, the instructions on the controller may include injecting at the first, lower dosing value (e.g., a "NO" at 810).

In a second example, a second mode (e.g., injecting reductant at a second dosing value higher than a first dosing value) is continued, despite a change in impact location. In the present example, an example injector and disperser device (as discussed, at the least with respect to FIGS. 3 and 4) transitions from injecting at a second location to a third location. An example controller that meters the injection of reductant by the example injector according to instructions included in the controller (e.g., routines 800 and 900).

Before transitioning between reductant dosing values, the controller determines that a change of impact location has occurred (e.g., at 910 or 810). Further, the new third location may be the same as a previous first impact location or an impact location occurring prior to the first impact location. The controller may then carry out instructions to determine if the third location is at a temperature higher than the second impact location (e.g., at 810), where the second impact takes on the role of a new first location and the third location takes on the role of a new second location. In this way a second mode (e.g., injecting reductant at a second dosing value higher than a first dosing value) may be continued, despite a change in impact location.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for a urea injector in a selective catalytic reduction (SCR) system, comprising:
    temporarily increasing a liquid reductant dosing value injected by the injector from a first dosing value to a second dosing value in response to an exhaust flow-rate change where injecting liquid reductant onto a first upstream-facing surface on a disperser device changes to injecting onto a second upstream-facing surface on the disperser device, each surface fully downstream of the injector.

2. The method of claim 1, further comprising decreasing the liquid reductant dosing value to the first dosing value in response to injecting liquid reductant onto the first upstream-facing surface and in response to injecting at the second dosing value for an elapsed time less than or equal to a heat-up threshold.

3. The method of claim 1, further comprising decreasing the liquid reductant dosing value to the first dosing value after injecting onto the second upstream-facing surface for an elapsed time greater than or equal to a cool-off threshold.

4. The method of claim 1, further comprising decreasing the second dosing value to an adjusted second dosing value in response to an elapsed time of injecting liquid reductant onto the second upstream-facing surface.

5. The method of claim 1, where the disperser device includes a plurality of fins arranged across an exhaust passage fully downstream of the injector and upstream of a catalyst, the first upstream-facing surface including a first fin and the second upstream-facing surface including a second fin at a higher temperature than the first fin, the second fin at the higher temperature than the first fin at the change from injecting liquid reductant onto the first upstream-facing surface to injecting onto the second upstream-facing surface.

6. The method of claim 5, where the first fin is positioned next to the second fin without any fins intervening between the first and second fins.

7. The method of claim 5, where the disperser device includes a first set of fins parallel to a direction of exhaust flow and a second set of fins angled to the direction of exhaust flow and the second dosing value further determined by at least one of an angle of the second fin and a surface area of the second fin included in the second upstream-facing surface.

8. The method of claim 5, where a surface area of the second upstream-facing surface is different from a surface area of the first upstream-facing surface.

9. A method for increasing delivery of urea to a catalyst in a selective catalytic reduction system, comprising:
    in a first mode, injecting urea at a first dosing value onto a first upstream-facing location, the first location including a first fin of a plurality of fins included in a urea disperser device, the plurality of fins arranged across an exhaust passage downstream of a urea injector and upstream of the catalyst;
    in a second mode, injecting urea at a second dosing value onto a second upstream-facing location, the second dosing value temporarily greater than the first dosing value, the second location including a second fin of the plurality of fins, the second fin at a higher temperature than the first fin at a time of transitioning from the first mode to the second mode; and
    transitioning from the first mode to the second mode in response to a change in exhaust flow-rate.

10. The method of claim 9, further comprising transitioning from the second mode to the first mode in response to injecting urea onto the first upstream-facing location and in response to injecting at the second dosing value for an elapsed time less than or equal to a heat-up threshold.

11. The method of claim 9, further comprising transitioning from the second mode to the first mode in response to injecting onto the second upstream-facing location for an elapsed time greater than or equal to a cool-off threshold.

12. The method of claim 9, further comprising decreasing the second dosing value to an adjusted second dosing value in response to an elapsed time of injecting urea onto the second upstream-facing location.

13. The method of claim 9, where a surface area of the second location is different from a surface area of the first location.

14. The method of claim 9, where the urea disperser device includes a first set of fins parallel to a direction of exhaust flow and a second set of fins angled to the direction of exhaust flow and the second dosing value further determined by at least one of an angle of the second fin and a surface area of the second fin included in the second upstream-facing location.

15. The method of claim 14, where the first fin is in the first set of fins and the second fin is in the second set of fins.

16. A method for a urea injector to increase delivery of urea to a catalyst in a selective catalytic reduction system, the method comprising:
   injecting urea at a first dosing value onto a first location including a first fin at a first temperature, the first fin included in a plurality of fins included in a urea disperser device, the plurality of fins arranged across an exhaust passage downstream of the urea injector and upstream of the catalyst;
   in response to injecting onto a second location, injecting at a second dosing value at the second location including a second fin, the second fin at a second temperature higher than the first temperature; and
   in response to at least one of an elapsed time greater than a cool-off threshold and a change from the second to the first location, injecting at the first dosing value.

17. The method of claim 16, further comprising, decreasing the second dosing value to an adjusted second dosing value in response to an elapsed time injecting urea onto the second location.

18. The method of claim 16, where the first fin is positioned next to the second fin without any fins intervening between the first and second fins.

19. The method of claim 16, where the urea disperser device includes a first set of fins parallel to a direction of exhaust flow and a second set of fins angled to the direction of exhaust flow and the second dosing value further determined by at least one of an angle of the second fin and a surface area of the second fin included in the second location.

20. The method of claim 19, having a definite order of events where, first, urea is injected at the first dosing value onto the first location, second, in response to injecting onto the second location, urea is injected at the second dosing value, and third, in response to the elapsed time greater than the cool-off threshold, urea is injected at the first dosing value at the second location.

* * * * *